United States Patent [19]

Osborn

[11] Patent Number: 4,556,015

[45] Date of Patent: Dec. 3, 1985

[54] FEED PROPORTIONER

[75] Inventor: Denis L. Osborn, Canton, Ga.

[73] Assignee: U.S. Industries, Inc., Stamford, Conn.

[21] Appl. No.: 588,222

[22] Filed: Mar. 12, 1984

[51] Int. Cl.[4] .............................................. A01K 5/00
[52] U.S. Cl. ................................................. 119/56 R
[58] Field of Search ................... 119/56 R, 51.11, 53; 222/457

[56] References Cited

U.S. PATENT DOCUMENTS

| 1,004,855 | 10/1911 | Daniels | 119/56 R |
|---|---|---|---|
| 1,442,382 | 1/1923 | Bullock | 119/56 R |
| 3,211,339 | 10/1965 | Piper | 222/76 |
| 3,225,742 | 12/1965 | Hagans | 119/51.11 |
| 3,225,743 | 12/1965 | McClure | 119/53 |
| 4,031,857 | 6/1977 | Jones | 119/56 R |
| 4,200,060 | 4/1980 | Van Daele | 119/56 R |
| 4,235,200 | 11/1980 | Shay | 119/51.11 |
| 4,279,221 | 7/1981 | Arvizu | 119/51.11 |
| 4,315,484 | 2/1982 | Kingery | 119/53 |
| 4,324,203 | 4/1982 | Chiappetti | 119/51.11 |

FOREIGN PATENT DOCUMENTS 214078 4/1924 United Kingdom ............ 119/56 R

Primary Examiner—Hugh R. Chamblee
Attorney, Agent, or Firm—Price, Heneveld, Huizenga & Cooper

[57] ABSTRACT

An animal feed proportioning device having a feed holding bin and an inlet channel that are separated by a vertical array of sliding gates. Each gate permits the bin to be filled to a predetermined level for later discharge by a discharge gate. Additionally, divider panels selectively block off portions of either the bin or inlet channel from the inflow of feed in order to reduce the amount of feed being metered through the device.

25 Claims, 14 Drawing Figures

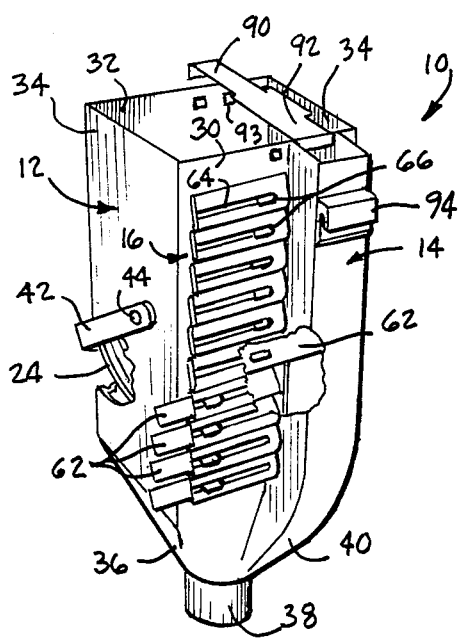
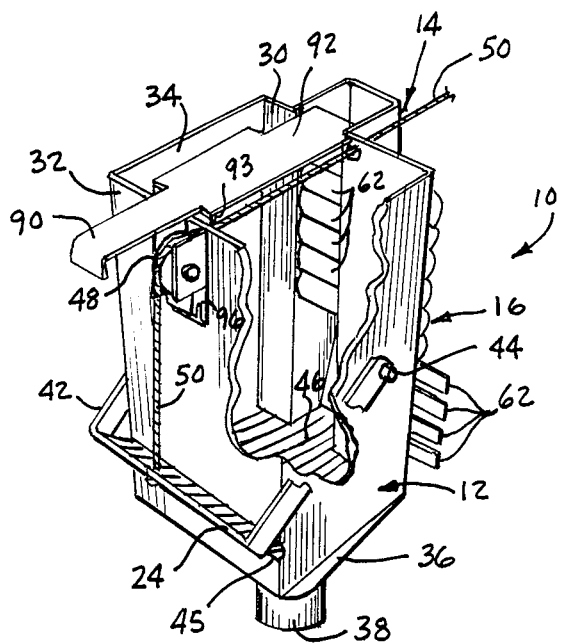
FIG. 1
FIG. 2
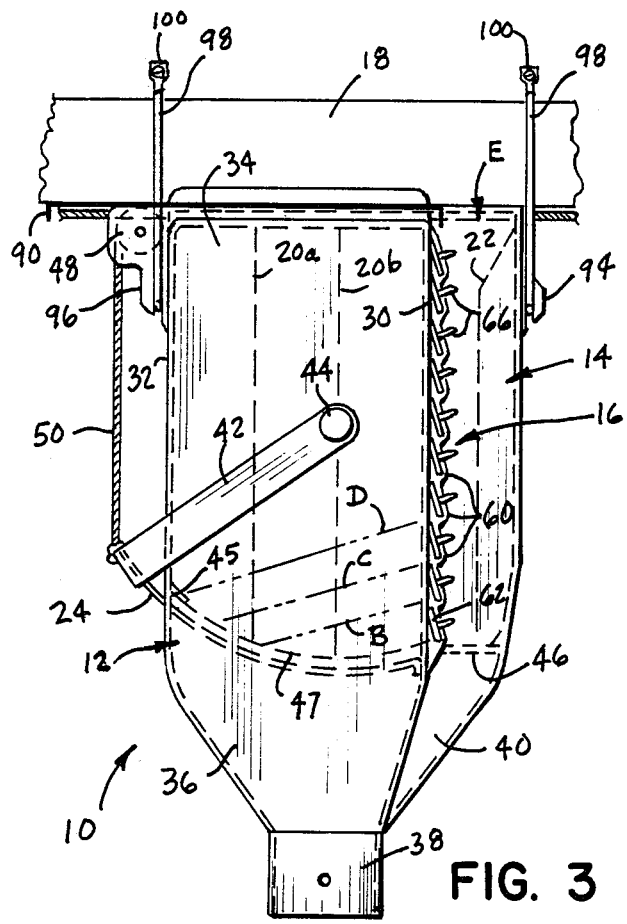
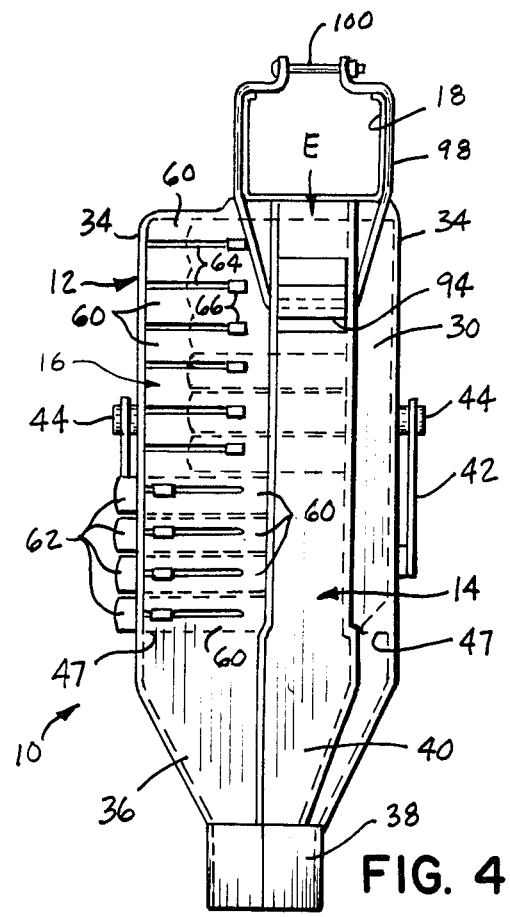
FIG. 3
FIG. 4 ner of FIG. 1, shown with the inlet closure gate removed, and
FEED PROPORTIONER

BACKGROUND OF THE INVENTION

The present invention relates to animal feeders and in particular to animal feeding apparatus which are used to selectively proportion the amount of feed delivered to a feeding station.

Animal feeders have long been used to automatically distribute animal feed to various animal feeding areas, thereby obviating the need to hand fill individual feed troughs. Common animal feeders include a feed conveying system, such as a chain conveyor or the like, which runs overhead to various animal feeding stations. At each station, a holding or filling bin is mounted in a position relative to the feed conveyor so as to be filled with feed by operation of the conveyor. To distribute feed into the animal feed troughs, a discharge gate on the holding bin is either automatically or manually opened, emptying the bin into the trough.

Such systems operate quite satisfactorily when a given size and/or number of animals are serviced by a single feed bin. However, quite often the size and/or number of animals within a particular pen varies from time to time, thus periodically requiring a different amount of feed to be distributed to that feeding station. For example, as the particular animals being fed mature, the amount of feed they require changes. For these reasons, the amount of feed to be delivered by the holding bin must be varied according to the particular feed requirements of any given time presented by the particular feeding station. Further, it is very important that certain types of breeding stock, for example sows and gilts, be prevented from overeating. If such breeding stock is limited to the proper amount of feed, healthier animals are produced, in addition to the limitation of feed waste and spoilage. It is therefore necessary from time to time to reduce the quantity of feed distributed to such breeding stock.

Heretofore, various apparatus and methods have been used in order to vary the amount of feed distributed by a typical animal feed holding bin. Due to the wide variance in feed requirements, there remains however, a need for an animal feeder or proportioner which provides a wide degree of control over the amount of feed delivered by the system, one which also permits a great many very small and relatively large incremental variations in the feed amount. It is desirable that such a feed proportioner can be adjusted quickly and easily, without requiring special tools or dismantling of the system.

SUMMARY OF THE INVENTION

The present invention solves the problems noted above by providing a feed holding bin having a main chamber and a feed inlet channel located adjacent thereto and separated by a vertical array of gates which can be selectively opened or closed. The amount of feed dropped into the bin is determined by selectively opening a predetermined number of gates starting from the bottom gate and moving upwardly. Having selected and opened such gates, feed dropped into the inlet channel from the conveyor is permitted to flow through the inlet channel into the feed holding bin, filling the main chamber up to a level determined by the height of the open gate and also filling the inlet channel. When the bin is discharged, only that amount of feed which has flowed into the main chamber and which filled the inlet channel is discharged into the associated feeding station.

Since the invention provides a plurality of sliding gates operable from the exterior of the feed holding bin, very small incremental changes in the amount of feed stored in the bin may be attained. Changes in feed delivery amount may therefor be effected quickly and easily without disassembly of the apparatus.

In another aspect of the invention, vertical divider panels are placed within either the main chamber or the inlet channel in order to restrict the flow of feed into certain portions of the bin or inlet channel. By insertion of these divider panels, substantial changes in the amount of feed delivered by the holding bin may be effected to accommodate the size and/or number of animals at a feeding station. The divider panels in conjunction with the sliding gates provide the feed proportioner with very wide latitude in feed quantity selection in various incremental amounts.

BRIEF DESCRIPTION OF THE DRAWINGS

FIG. 1 is a front perspective view of a feed proportioner embodying the present invention shown with a portion of the housing broken away;

FIG. 2 is a rear perspective view of the feed proportioner of FIG. 1, shown with a portion of the housing broken away;

FIG. 3 is a side elevational view of the feed proportioner of FIG. 1, shown mounted on a feed conveyor trough;

FIG. 4 is a front elevational view of the trough mounted feed proportioner shown in FIG. 3;

DETAILED DESCRIPTION OF THE PREFERRED EMBODIMENT

Figure 5:
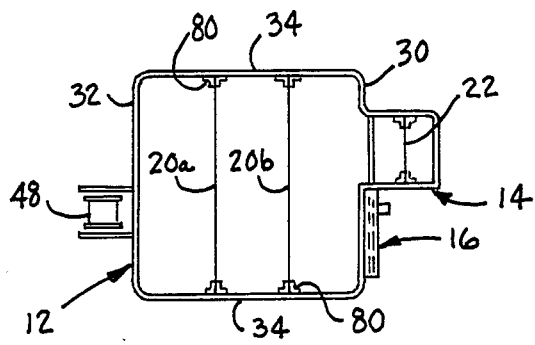
FIG. 5 is a top plan view of the feed proportioner of FIG. 1, shown with the inlet closure gate removed, and first and second alternative bin divider panels and an inlet channel divider panel inserted therein.

In the preferred embodiment shown in FIGS. 1–4, a feed proportioning device 10 includes a feed holding bin including the main chamber 12 that is supplied feed by an inlet channel 14. A vertical array of sliding gates 16 separate chamber 12 and inlet channel 14. As shown in FIGS. 3 and 4, a feed conveyor system 18 is arranged to drop feed into inlet channel 14 for supplying feed to the holding bin for subsequent dispensing of the feed to its station. The amount of feed the bin is permitted to fill with is determined by the number of open gates counted from the lowermost gate. Additionally, a bin divider panel 20 and an inlet channel divider panel 22 may be inserted into proportioning device 10 in order to block certain zones from filling with feed, thus reducing the amount of feed held within the device. At the lower end of the device is a discharge gate 24, FIGS. 1–3, which is opened in order to permit the discharge of the feed from both bin 12 and channel 14.

As shown in FIGS. 1 and 2, feed holding bin has a front wall 30, a back wall 32, and a pair of side walls 34 forming a main chamber or housing 12. At the bottom of chamber 12, walls 30–34 form an angled lower discharge section 36, from which depends a discharge outlet or spout 38. Outlet 38 is communicative in a conventional manner to an associated feed trough or station, such as by a downspout (not shown) or simply by being positioned over the trough. Chamber 12 has a generally elongated rectangular configuration with a square cross section. As shown the top of chamber 12 is open, but may alternatively be closed by a cover panel or the like for use in environments in which the feed may be contaminated.

Inlet channel 14 is a narrow, generally rectangular channel that protrudes forward from front wall 30 and extends from the top of bin 12 down to angled discharge section 36. The lower end of inlet channel 14 forms an angled section 40 which is complementary to and communicative with bin angled discharge section 36. As shown in FIG. 2, inlet channel 14 is open to the main housing 12 of holding bin along substantially the entire width and length of inlet channel 14.

As shown in FIGS. 1–3, discharge gate 24 is an upwardly concavely curved panel that is pivotally mounted on housing 12 by a pivot bracket 42. Bracket 42 has two arms pivotally mounted by a pivot 44 on opposite side walls 34. Gate 24 passes through a horizontal slot 45 in rear wall 32 located just above angled discharge section 36. Extending forward of the front edge of gate 24 is an inlet closure tab 46, FIGS. 2–3. Tab 46 is generally square in shape and protrudes into channel 14 when gate 24 is closed to completely block the passage of feed down into angled inlet discharge section 40.

As shown in FIG. 4, side walls 34 each include a protrusion 47 that protrudes into main chamber 12 above discharge gate 24. Protrusions 47 extend along side walls 34 above discharge gate 24 to prevent feed from spilling or leaking around the sides of gate 24 and into discharge section 36. Protrusions 47 are triangular shaped sections bent inward from side walls 34.

As shown in FIGS. 2 and 3, a pulley 48 is mounted on rear wall 32 at the top of bin 12 between a pair of mounting brackets. A gate operating cable 50 is connected to pivot bracket 42 and extends up to and around pulley 48. Cable 50 extends through bin 2, FIG. 2, and runs to an independent control mechanism (not shown) of conventional design activates pulley 48 in order to raise cable 50 and thereby pivotally open gate 24. Due to the curvature of gate 24, gate 24 slides easily through slot 45 in order to open the bin including chamber 12 and inlet channel 14 to discharge outlet 38. When in a closed condition, curved gate 24 extends downward and forward beneath bracket 42, so that gravity will cause gate 24 to automatically close to a fully closed position when the control of pulley 48 is released.

Sliding gate array 16 provides a means for separating inlet channel 14 from chamber 12. As shown in FIGS. 3 and 4, gate array 16 includes ten vertically spaced, adjacent channels 60. Each channel 60 slidably contains a generally flat, rectangular gate 62, the lower four of which are shown in FIGS. 1, 2 and 4 in an open position protruding out of panel 60. As shown in FIG. 3, channels 60 and gates 62 are angled slightly so that the top and bottom of adjacent gates 62 and horizontally overlapping. This slight horizontal overlap allows the top and bottom of vertically adjacent gates 62 to be positioned at the same height and act as an overlap to prevent feed from flowing between adjacent gates 62. As shown in FIGS. 1 and 2, gates 62 when closed extend across and completely block off the openings between inlet channel 14 and chamber 12.

Figure 8:
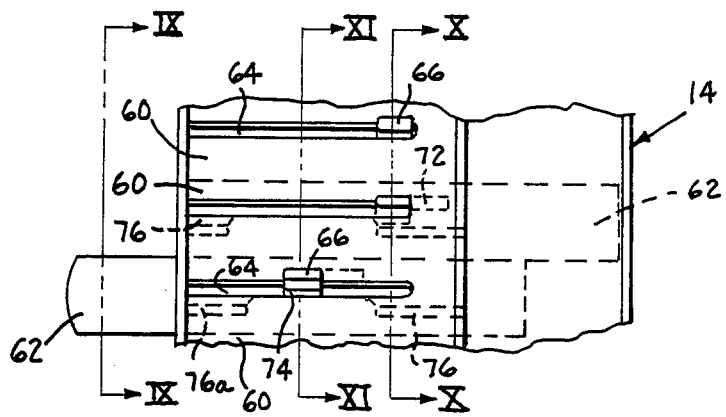
FIG. 8 is a fragmentary, front elevational view of the sliding gate mechanism of the feed proportioner of FIG. 1, shown with one sliding gate halfway open.
Figure 9:
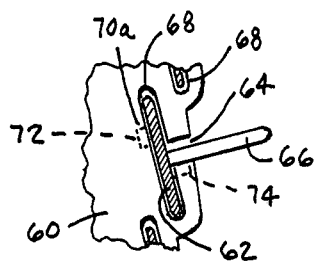
FIG. 9 is a fragmentary, side elevational view of the sliding gate assembly taken along plane IX—IX of FIG. 8.

As shown in more detail in FIGS. 8–11, each channel 60 includes a handle slot 64 through which a gate handle 66 protrudes. Extending through the side of each channel 60 is a gate slot 68 in which gate 62 is received, FIGS. 9–11. Internal to each channel 60 is an enlarged rear slot area or key slot 70, FIGS. 10 and 11, which receives a blocking tab 72 on the rear surface of gate 62. As shown in FIG. 9, key slot 70 has a shoulder 70a providing a stop for blocking tab 72 to prevent gate 62 from being inadvertently fully removed from channel 60.

Figure 10:
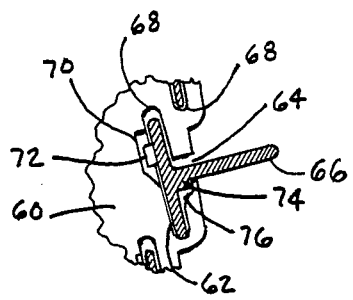
FIG. 10 is a fragmentary, side sectional view of the sliding gate assembly, taken along plane X—X of FIG. 8.
Figure 11:
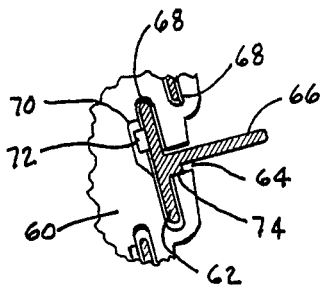
FIG. 11 is a fragmentary, side sectional view of the sliding gate assembly taken along plane XI—XI of FIG. 8.

In order to lock each gate 62 in either a fully open or a fully closed position, a locking tab 74 is provided on the under surface of handle 66 on the front face of gate 62. As shown in FIGS. 8 and 10, each gate slot 68 includes recesses 76 and 76a which receive locking tab 74. In a locked closed position of gate 62, shown in FIG. 10, locking tab 74 is received in recess 76 with handle 66 resting against the lower edge of slot 64. To open gate 62, handle 66 is raised and slid sideways so that locking tab 74 rests against the lower edge of slot 64, as shown in FIG. 11. When gate 62 reaches a fully open position, locking tab 74 will drop down into recess 76a, similar to the position shown in FIG. 10. Although gate array 16 preferably utilizes sliding gates as described above, other types of gates known in the art can be alternatively used therefor.

Figure 6:
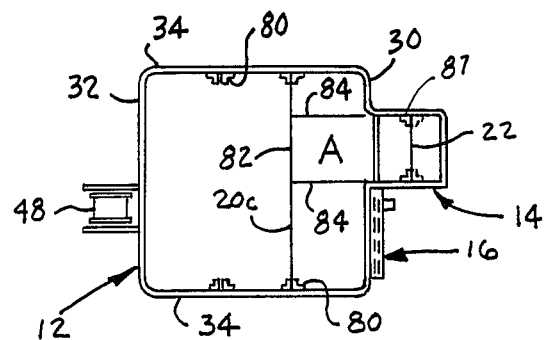
FIG. 6 is a top plan view of the feed proportioner of FIG. 1, shown with the inlet closure gate removed and a third alternative divider panel means inserted therein.
Figure 7:
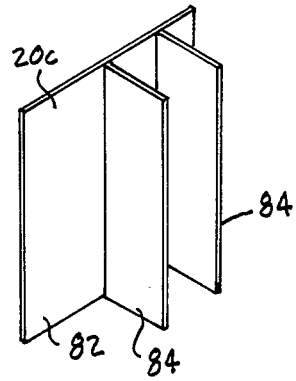
FIG. 7 is a perspective view of the third alternative divider panel means shown in FIG. 6.

Bin divider panel 20 is a generally flat, rectangular plate which slides downward into one set of two pairs of divider panel supports 80, the two supports 80 of each set located directly opposite each other on side walls 34, FIG. 5. Divider panel 28 is tall enough to extend from the top of bin 12 down to discharge gate 24. A rear bin divider panel position 20a is positioned closer to rear wall 32 than front divider panel position 20b, as shown in FIG. 5. When inserted into rear divider panel position 20a, panel 20 blocks approximately one-third of bin 12 off from the introduction of feed through inlet 14. Front bin divider panel position 20b blocks off approximately two-thirds of bin 12 from the introduction of feed. Due to the curvature of gate 24, panel 20 protrudes upward slightly more when inserted at position 20a than at postion 20b, as shown in FIG. 3. Although two divider panels are shown in FIG. 5 for illustration at position 20a and 20b, normally only one such divider panel 20 is used at any given time. Another bin divider panel 20c is shown in FIGS. 6 and 7. Bin divider panel 20c includes a generally flat, rectangular wall panel 82, on the front of which are two forwardly extending separator panels 84. As shown in FIG. 6, separator panels 84 are spaced to correspond to the width of channel 14, so that a relatively small area "A" is accessible to the feed through inlet channel 14, FIG. 6.

Similar to bin divider panels 20, inlet divider panel 22 may be slidably inserted into a pair of divider guides 87 within inlet channel 14, FIG. 6, to provide a means for blocking off a portion of channel 14 from the flow of feed. Inlet divider panel 22 is a generally rectangular flat plate, and includes an angled upper surface 86, FIGS. 13 and 14, that deflects feed dropping into channel 14 and prevents it from falling between divider 22 and the front wall of channel 14.

As shown in FIGS. 1 and 2, a closure gate 90 is slidably mounted on the top of feed proportioner 10. Closure gate 90 is a generally flat strip of material having an end 92 that protrudes over the top of inlet 14 in order to completely block inlet 14 off from conveyor assembly 18. Gate 92 also includes stop tabs 93, FIGS. 1-2, within chamber 12 and opposite end 92 which prevent gate 92 from being inadvertently fully removed from proportioner 10. Closure gate 90 may be manually operated, or may be provided with suitable controls (not shown) of conventional design which will allow automatic or remote activation of gate 90. Gate 90 is used to isolate proportioner 10 from the remainder of an animal feeding system.

As shown in FIG. 3, proportioner 10 has a front hook 94 which protrudes forward of inlet 14. A rear hook 96 is located on rear wall 32 beneath pulley 48. A pair of hanging brackets 98 are received in hooks 94 and 96, extend upward around conveyor assembly 18 and are each pinned together by a bolt 100. Proportioner 10 is thus suspended from conveyor assembly 18 at the desired feed station in a conventional manner. Conveyor system 18 may be of any conventional design, most commonly a chain conveyor, auger conveyor or the like. Although conveyor system 18 is shown having a rectangular cross section conveying trough, proportioner 10 may be readily adapted to troughs having circular cross sections, such as those used with auger conveyors or other configurations. Conveyor system 18 has an opening at location "E" that is located directly above inlet 14. Opening "E" allows feed to drop readily from conveyor 18 into inlet 14 and bin 12.

Preferably, feed proportion chamber 12 and inlet 14 are molded in two half sections, such as from structural foam, polyethylene, pvc or other moldable material, and then bolted together. External reinforcing ribs or lands may be provided where necessary, such as at pivots 44. Gates 62 are preferably injection molded from a semi-rigid polymeric material, preferably polyvinylchloride. Mounting bracket 42 is preferably formed from 11-gauge steel or other suitable material, while discharge gate 24 is preferably manufactured from 16-gauge galvanized steel, or other material sufficiently heavy to assure adequate closing.

Preferably, walls 30, 32 and 34 of bin 12 are approximately six and a quarter inches wide, while the walls of inlet channel 14 are each preferably approximately two inches wide. At its midpoint between walls 30 and 32, discharge gate 24 is located approximately 10 and one-half inches from the top of bin 12. Discharge channel 38 has a diameter of approximately two and three-quarter inches. Each gate 62 is preferably approximately one inch high and five and one-half inches long.

OPERATION

In order to operate feed proportioner 10, divider panels 20 and/or 22 are inserted into the device as is required. Proportioner 10 is hung from conveyor assembly 18 by hanger brackets 98 so that conveyor outlet "E" is positioned over inlet channel 14. Gates 62 are opened in order to permit a predetermined amount of feed to flow into bin 12. While gate 24 is in a closed position, conveyor assembly 18 is switched on to supply feed to inlet 14. Once bin 12 has been filled to the proper level and inlet 14 fills, any additional feed is conveyed across the top of inlet channel 14 to other feed proportioners. When all the feed proportioners 10 are filled, conveyor system 18 is shut down, either manually or automatically.

When pulley 48 is activated, cable 50 is raised, opening gate 24. The feed stored within bin 12 and inlet 14 falls through discharge outlet 38 into the appropriate feed trough. If for some reason feed proportioner 10 is not to be used with the remainder of the system, such as when the associated feeding station is empty, gate 90 is closed in order to isolate that proportioner from conveyor assembly 18.

For an example of one setting for the proportioner, as shown in FIG. 3 when the lowermost gate 62 is opened, feed is permitted to flow into the holding bin until it fills the chamber 12 to a level "b" at the top of lowermost gate 62 and then fills the inlet channel 14 at which time, although feed continues to be conveyed by the conveyor in trough 18, no further feed will fall into the bin. Level "b" angles rearwardly downward from the top of gate 62 according to the angle of repose of the particular feed being metered through bin 12. If the second gate 62 from the bottom is opened, or alternatively if the lowermost two gates 62 are opened, feed will flow into chamber 12 until it reaches a level "c" that is even with the upper edge of the second gate 62 after which the feed fills inlet channel 14. Level "d" denotes the level to which the third gate 62 from the bottom will fill chamber 12, and so on, each gate 62 permitting chamber 12 be filled to a predetermined level.

Figure 12:
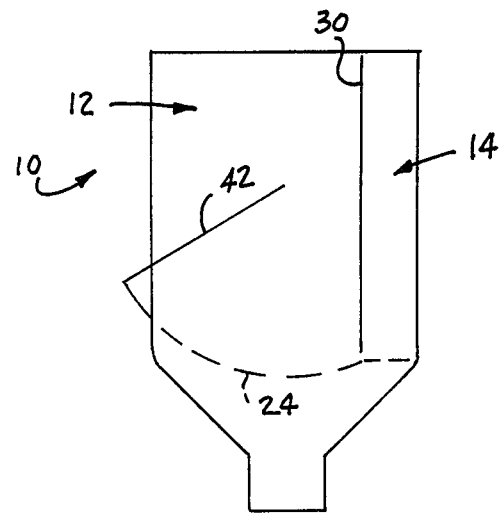
FIG. 12 is a side elevational, schematic view of a feed proportioner without divider panels inserted therein.

In a feed proportioner having the preferred dimensions described above, given feed having a weight of forty pounds per cubic foot, proportioner 10 will meter the following incremental amounts of feed. When proportioner 10 is set up as shown in FIG. 12 without any divider panels, the minimum amount of feed deliverable is 0.7 pounds. This minimum feed delivery is obtained by closing all gates 62 so that only inlet channel 14 fills with feed. The amount of feed is increased in increments of approximately 0.66 pounds for each gate that is opened from the bottom of the device. The maximum feed delivered will therefore be 7.3 pounds with all of the gates open. Due to the curvature of discharge gate 24, there is some variance in the increments provided by the lowermost gates 62.

Figure 13:
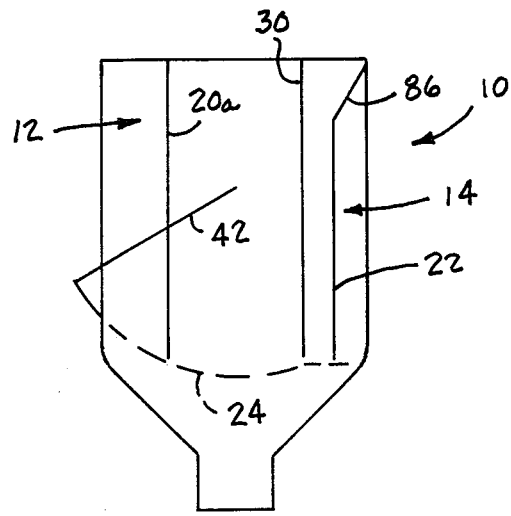
FIG. 13 is a side elevational, schematic view of a feed proportioner, shown with a divider panel arrangement inserted therein.
Figure 14:
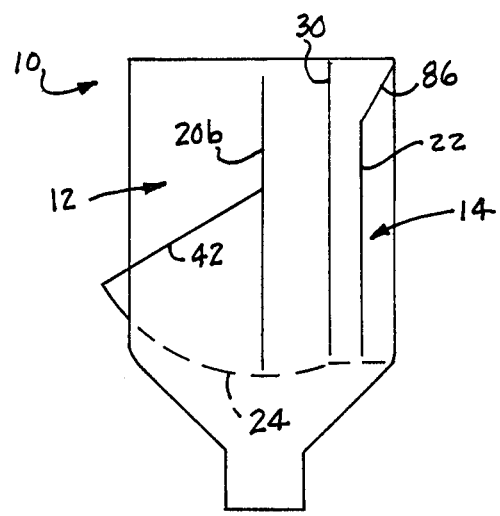
FIG. 14 is a side elevational, schematic view of a feed proportioner, shown with an alternative divider panel arrangement inserted therein.

If feed proportioner 10 is arranged as shown in FIG. 13, with bin divider panel at position 20a and inlet divider panel 22 inserted, the minimum amount of feed deliverable is 0.4 pounds with all gates closed. Each gate will add an increment of approximately 0.5 pounds with a maximum feed delivery of 5.4 pounds. When feed proportioner 10 is arranged as shown in FIG. 14, the minimum feed deliverable is 0.4 pounds. Each gate adds an increment of approximately 0.25 pounds with a maximum feed delivery of 2.9 pounds. If proportioning device 10 is arranged as shown in FIG. 6 with bin divider 20c and inlet divider 22 inserted, the minimum feed deliverable is 0.4 pounds. Each gate adds an increment of approximately 0.1 pound to a maximum feed deliver of 1.4 pounds.

It will be noted that the above is merely a description of the preferred embodiment and it will be apparent to those skilled in the art that various modifications and improvements may be made without departing from the spirit of the invention disclosed herein. The scope of the protection afforded is to be determined by the claims which follow and the breadth of interpretation which the law allows.

The embodiments of the invention in which an exclusive property or privilege is claimed are defined as follows.

1. An animal feeder apparatus, comprising:
   a feed holding bin having a main chamber and an inlet means for introducing feed into said chamber from a feed supply;
   means for selectively discharging feed from said bin into an animal feeding location;
   means for controlling the amount of feed introduced into said chamber, said controlling means including a plurality of vertically arrayed gate means located between said inlet means and said main chamber for selectively permitting or preventing the passage of feed therebetween, whereby when selected ones of each of said vertically arrayed gate means are opened, the passage of feed therethrough is permitted to fill said chamber to a predetermined level depending upon which of said gate means is open.

2. The animal feeder of claim 1, wherein said discharge means includes a curved lower gate mounted on said feed holding bin to selectively block a discharge chute on the bottom of said chamber, said curved lower gate having a tab thereon, said tab being shaped to selectively protrude into said inlet means.

3. An animal feeding system comprising:
   an animal feed supply and a feed conveyor assembly associated therewith;
   a plurality of animal feeder apparatus as defined in claim 1 operably connected to said feed conveyor assembly.

4. The animal feeder of claim 1, further comprising means for selectively blocking a zone of said chamber from being supplied with feed to selectively vary the amount of feed held therein.

5. The animal feeder of claim 4, wherein said inlet means includes an inlet channel oriented to store feed therein, said inlet channel including means for selectively blocking a zone of said inlet channel from filling with feed to selectively vary the amount of feed held therein.

6. The animal feeder of claim 5, wherein said gate means include a plurality of vertically arrayed sliding gates which slide between said chamber and said inlet means.

7. The animal feeder of claim 6, wherein said blocking means for said chamber includes a divider panel selectively positionable within said chamber.

8. The animal feeder of claim 7, wherein said inlet channel blocking means includes a divider panel selectively positionable within said inlet channel.

9. The animal feeder of claim 8, wherein said sliding gates are each oriented at an angle other than vertical, and each said gate has an upper edge that is positioned at least as high as the lower edge of said gate thereabove.

10. The animal feeder of claim 4, wherein said gate means includes a plurality of vertically arrayed sliding gates which slide between said chamber and said inlet means.

11. The animal feeder of claim 1, wherein said inlet means includes an inlet channel oriented to store feed therein, said inlet channel including means for selectively blocking a zone of said inlet channel from filling with feed to selectively vary the amount of feed held therein.

12. The animal feeder of claim 11, wherein said inlet channel blocking means includes a divider panel selectively positionable within said inlet channel.

13. The animal feeder of claim 1, wherein said gate means includes a plurality of vertically arrayed sliding gates which slide between said chamber and said inlet means.

14. The animal feeder of claim 13, wherein said gates each have a handle accessible from the exterior of said bin.

15. The animal feeder of claim 13, wherein said gates are each immediately adjacent the next vertical gate.

16. The animal feeder of claim 13, wherein said sliding gates are each oriented at an angle other than vertical, and each said gate has an upper edge that is positioned at least as high as the lower edge of said gate thereabove.

17. The animal feeder of claim 1, wherein said inlet means includes an inlet channel extending along the side of said bin and extending from the upper end of said bin to the lower end of said bin, said channel being communicative with said chamber along substantially the entire length of said channel, said gate means being located along the entire length of said inlet channel communicative with said chamber.

18. The animal feeder of claim 17, wherein said discharge means includes a curved lower gate mounted on said feed holding bin to selevtively block a discharge chute on the bottom of said chamber, said curved lower gate having a tab thereon, said tab being shaped to selectively protrude into said inlet means.

19. An animal feed proportioner, comprising:
   a feed holding chamber having an inlet thereto, a discharge outlet located at the lower end thereof and a discharge outlet closure element operably connected thereto, said inlet opening into said holding chamber through a side of said holding chamber;
   a plurality of vertically spaced gates operably mounted on said holding chamber so as to selectively close said inlet thereto, each said gate having a height sufficient to selectively block a portion of said inlet from communication with said holding chamber through said side of said holding chamber, whereby when said inlet is connected to a feed supply as each said gate is opened the passage of feed therethrough is permitted to fill said feed holding chamber to a predetermined level for each said gate.

20. An animal feeding system comprising:
   an animal feed supply and a feed conveyor assembly associated therewith;
   a plurality of animal feed proportioners as defined in claim 19 operably connected to said feed conveyor assembly.

21. The animal feed proportioner of claim 19, wherein each said gate is slidably mounted on said chamber to slide laterally across a portion of said inlet.

22. The animal feed proportioner of claim 21, further comprising a divider panel selectively insertably mounted in said chamber having a generally vertically oriented blocking surface.

23. The animal feed proportioner of claim 22, further comprising an inlet channel communicative with said chamber through said inlet, said inlet channel including an animal feed blocking panel selectively insertably mounted therein.

24. An animal feed proportioner, comprising:
- a feed holding chamber having an inlet thereto, a discharge outlet located at the lower end thereof and a discharge outlet closure element operably connected thereto;
- an inlet channel communicative with said chamber through said inlet, said inlet channel including an animal feed blocking panel selectively insertably mounted therein;
- a plurality of vertically spaced gates operably mounted on said holding chamber so as to selectively close said inlet thereto, each said gate slidably mounted on said chamber to slide laterally across a portion of said inlet, said gates being oriented at an angle other than vertical, with the top of each said gate at a height at least as high as the bottom of said gates thereabove, whereby when said inlet is connected to a feed supply as each said gate is opened the passage of feed therethrough is permitted to fill said feed holding chamber to a predetermined level for each said gate; and
- a divider panel selectively insertably mounted in said chamber having a generally vertically oriented blocking surface.

25. An animal feed proportioner, comprising:
- a feed holding chamber having an inlet thereto, a discharge outlet located at the lower end thereof and a discharge outlet closure element operably connected thereto; and
- a plurality of vertically spaced gates operably mounted on said holding chamber so as to selectively close said inlet thereto, said gates being oriented at an angle other than vertical, with the top of each said gate at a height at least as high as the bottom of said gate thereabove, whereby when said inlet is connected to a feed supply as each said gate is opened the passage of feed therethrough is permitted to fill said feed holding chamber to a predetermined level for each said gate.

* * * * *

UNITED STATES PATENT AND TRADEMARK OFFICE
CERTIFICATE OF CORRECTION

PATENT NO. : 4,556,015
DATED : December 3, 1985
INVENTOR(S) : Denis L. Osborn

It is certified that error appears in the above-identified patent and that said Letters Patent is hereby corrected as shown below:

Column 4, line 13:
    "62 and" should be --62 are--

Column 8, claim 18, line 38:
    "selevtively" should be --selectively--

Signed and Sealed this

Eighth Day of April 1986

[SEAL]

Attest:

DONALD J. QUIGG

Attesting Officer

Commissioner of Patents and Trademarks